United States Patent [19]
Kelleher

[11] Patent Number: 5,287,438
[45] Date of Patent: Feb. 15, 1994

[54] SYSTEM AND METHOD FOR DRAWING ANTIALIASED POLYGONS

[75] Inventor: Brian M. Kelleher, Palo Alto, Calif.

[73] Assignee: Digital Equipment Corporation, Maynard, Mass.

[21] Appl. No.: 929,845

[22] Filed: Aug. 13, 1992

Related U.S. Application Data

[63] Continuation of Ser. No. 438,356, Nov. 17, 1989, abandoned.

[51] Int. Cl.⁵ .................................................. G06F 3/14
[52] U.S. Cl. ...................................... 395/132; 395/129
[58] Field of Search ............... 340/728, 729, 747, 750; 358/903; 382/33, 36, 52, 56; 395/129, 128, 131, 132, 140, 142, 143

[56] References Cited

U.S. PATENT DOCUMENTS

| | | | |
|---|---|---|---|
| 4,371,872 | 2/1983 | Rossman | 340/728 |
| 4,528,642 | 7/1985 | Waller | 364/900 |
| 4,590,465 | 5/1986 | Fuchs | 340/723 |
| 4,755,810 | 7/1988 | Knierem | 340/726 |
| 4,780,711 | 10/1988 | Doumas | 340/728 |
| 4,783,649 | 11/1988 | Fuchs et al. | 340/747 |
| 4,811,245 | 3/1989 | Bunker et al. | 364/521 |
| 4,908,780 | 3/1990 | Priem et al. | 364/521 |
| 4,918,626 | 4/1990 | Watkins et al. | 364/522 |
| 4,991,122 | 2/1991 | Sanders | 364/521 |

FOREIGN PATENT DOCUMENTS 2187368 9/1987 United Kingdom .

OTHER PUBLICATIONS

Crow "A Comparison of Antialiasing Techniques," IEEE CG&A, Jan. 1981 pp. 40–48.
Carpenter "The A-buffer, an Antialiased Hidden Surface Method" 18 Computer Graphics 103-108, Jul. 1984.
Computer Graphics, vol. 17, No. 3, Jul. 1983; "A Parallel Scan Conversion Algorithm with Anti-Aliasing for a General-Purpose Ultracomputer"; Eugene Fiume et al.; pp. 141-150.

Primary Examiner—Phu K. Nguyen
Attorney, Agent, or Firm—Flehr, Hohbach, Test, Albritton & Herbert

[57] ABSTRACT

A system (30) draws antialiased polygons. A CPU (32) is connected to a floating point processor (FPU) (34) by bus (36). The CPU (32) is connected by a 32-bit system bus (38) to a random access memory (RAM) (40), a cache (42) and an interface (44) in graphics subsystem (45). The interface (44) is connected by bus (46) to graphics processor (48). The graphics processor (48) is connected by 120-bit graphics bus (50) to frame buffer (52). The frame buffer (52) is connected to a video digital to analog converter (DAC) (54) by bus (56). The DAC (54) is connected to video display (58) by line (60). The graphics processor (48) use a technique known as super-sampling to combat the effects of aliasing. In aliased mode, the graphics processor (48) use 16 array sites to sample 16 pixels (72). When drawing a polygon or line in antialiased mode, the graphics processor (48) uses the 16 sites to sample at 16 locations (120) within a single pixel (72). The antialiasing is done by determining what proportion of the locations (120) within each pixel (72) are within the polygon and setting a color of each pixel (72) on the basis of the proportion.

24 Claims, 9 Drawing Sheets

SYSTEM AND METHOD FOR DRAWING ANTIALIASED POLYGONS

This is a continuation of application Ser. No. 07/438,356 filed Nov. 17, 1989, now abandoned.

CROSS REFERENCE TO RELATED APPLICATIONS

This application and the following commonly assigned applications are directed to related inventions: application Ser. No. 07/134,773, filed Dec. 18, 1987 in the names of Brian M. Kelleher and Thomas C. Furlong, entitled, "Method of Drawing in Graphics Rendering System," and application Ser. No. 07/137,752, filed Dec. 24, 1987 in the names of Brian M. Kelleher and Thomas C. Furlong, entitled, "Method of Tiling a Figure in Graphics Rendering System."

BACKGROUND OF THE INVENTION

1. Field of the Invention:

The present invention relates generally to a system and method for reducing a staircasing effect known as aliasing in polygons drawn on a raster graphics display subsystem. Reducing the staircasing effect by smoothing the edges of the raster polygon is known as antialiasing. More particularly, it relates to such an antialiasing system and method that samples the polygon multiple times per pixel.

2. Description of the Prior Art:

The task of scan-converting a polygon on a raster graphics display subsystem is to determine the coordinates of the pixels which lie inside the polygon on a two-dimensional raster grid. Fully illuminating those pixels inside the line segments comprising the polygon will result in a staircase pattern which approximates the polygon.

Known techniques for antialiasing polygons are both time consuming, computation intensive and would require extensive additional hardware support if implemented in hardware form. Such algorithms serve their intended function well if the raster graphics display subsystem is a high enough performance subsystem. However, for low cost workstation applications, compromises in the raster graphics display processing speed are required in order to be price competitive. The use of reduced instruction set computer (RISC) central processing units (CPUs) in such workstations minimizes the extent of compromise required in processor performance, but the use of traditional antialiasing algorithms would make graphics response in these workstations appear to be sluggish. A need therefore exists for a system and method for antialiasing polygons that is faster and less computation intensive than the traditional techniques.

SUMMARY OF THE INVENTION

A system for drawing antialiased polygons in accordance with this invention has a host data processor. A memory is connected to the host data processor by a bus. A graphics processor is connected to the bus. A display includes a plurality of pixels for displaying the polygons. A frame buffer is connected between the graphics processor and the display. The graphics processor includes a program for sampling an image array. The image array is selectively reconfigurable by the program to comprise either a plurality of the pixels or a plurality of locations within one of the pixels.

A method for drawing antialiased polygons in accordance with this invention includes providing a graphics processor including a program for sampling an image array. The image array is selectively configured with the program to comprise either a plurality of pixels or a plurality of locations within one of the pixels. The image array is sampled as configured. These steps produce antialiased polygons.

The attainment of the foregoing and related advantages and features of the invention should be more readily apparent to those skilled in the art, after review of the following more detailed description of the invention, taken together with the drawings, in which:

DETAILED DESCRIPTION OF THE INVENTION

Figure 1:
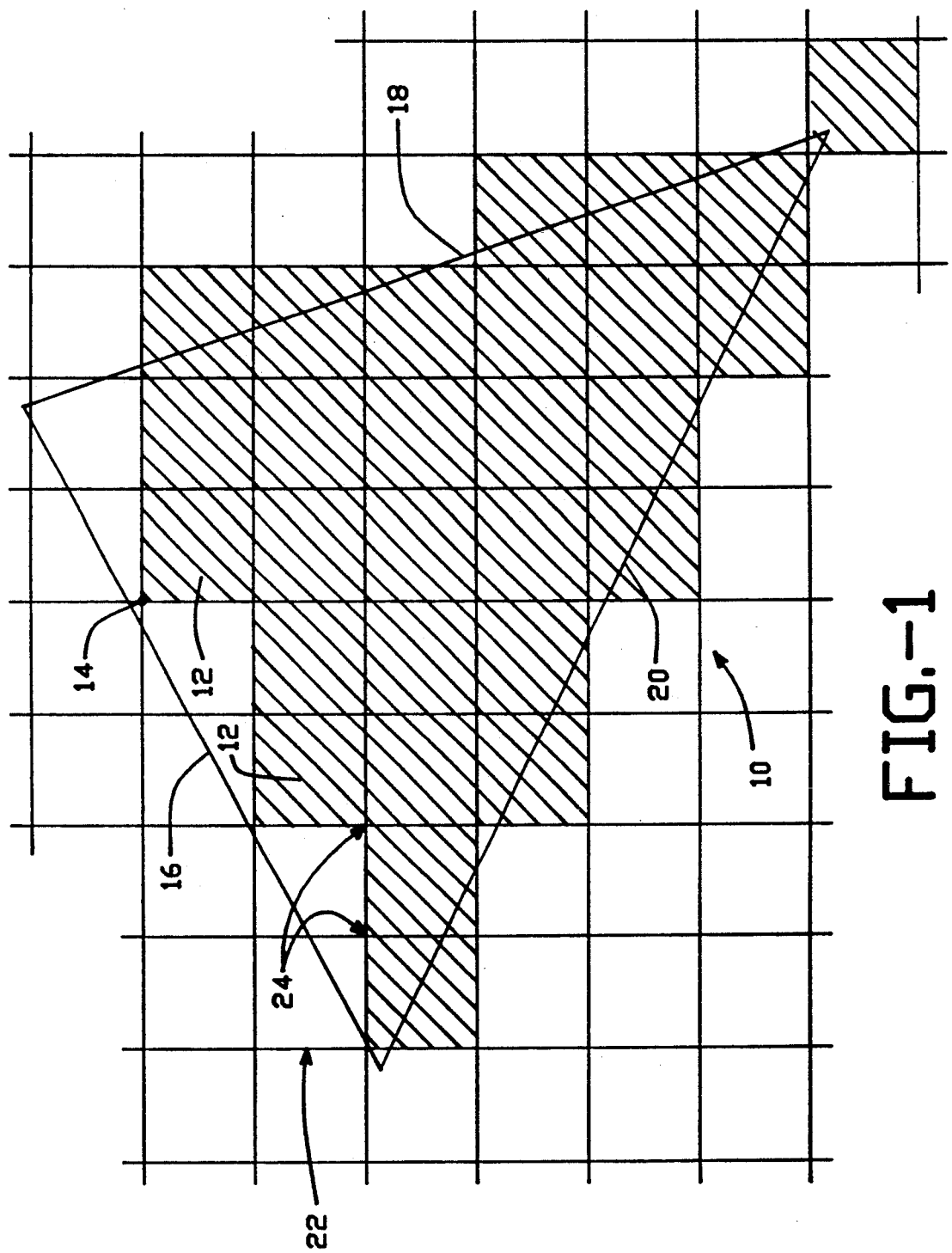
FIG. 1 is a representation of an aliased polygon, useful for understanding the present invention.

Turning now to the drawings, more particularly to FIG. 1, there is shown an aliased triangle 10, in which pixels 12 having upper left hand corner 14 inside the triangle 10 have been illuminated. As shown, the illuminated pixels 12 correspond only approximately to the triangle shape bounded by the line segments 16, 18 and 20. The task of scan-converting the polygon, such as the triangle 10, on a raster graphics display subsystem is to determine the coordinates of the pixels 12 which lie inside the triangle 10 of a two-dimensional raster grid 22. Fully illuminating the pixels 12 inside the line segments 16-20 will result in a staircase pattern 24 which approximates the triangle.

Figure 2:
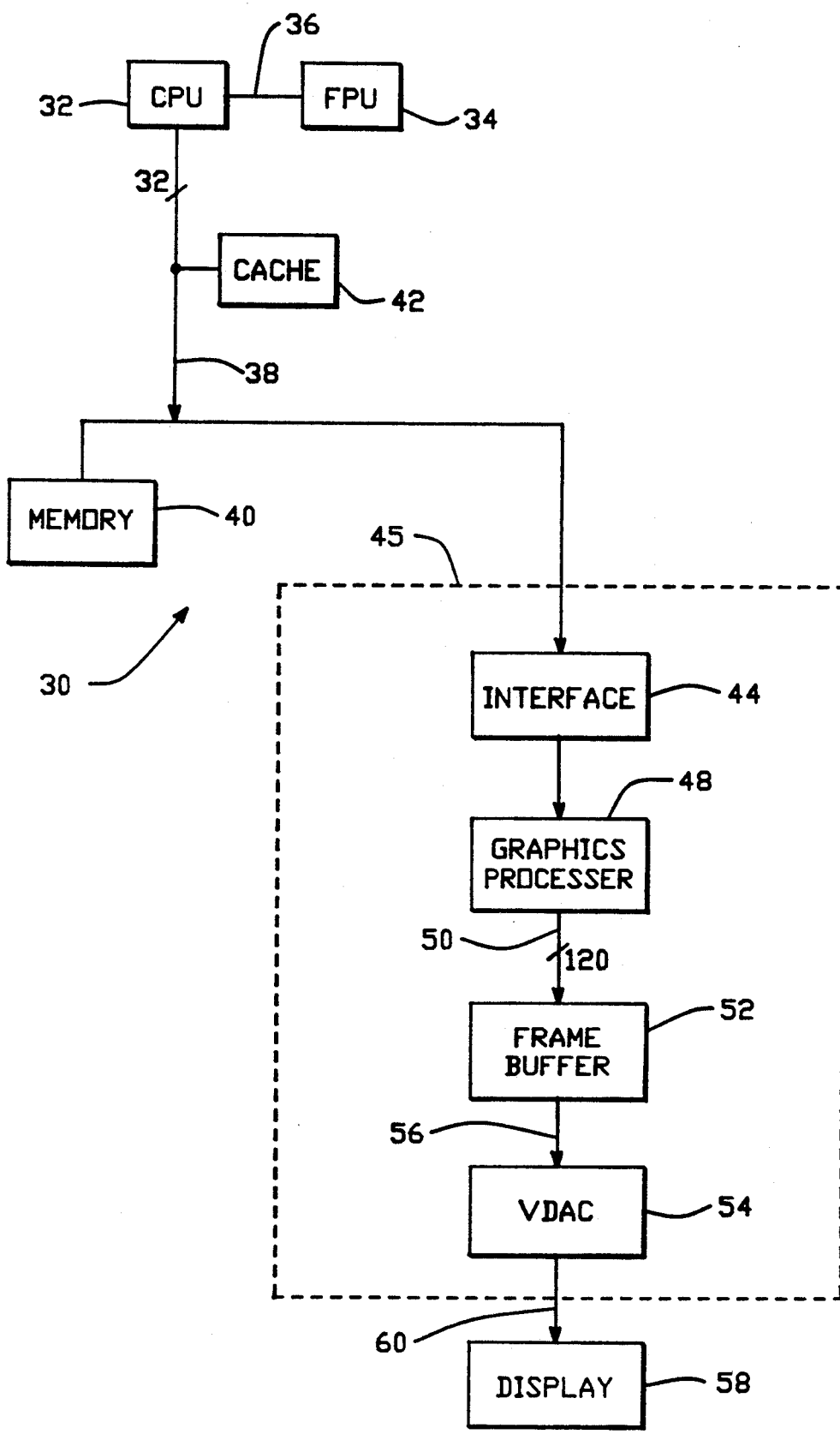
FIG. 2 is a generalized block diagram of a system for drawing antialiased polygons in accordance with the invention.

FIG. 2 is a block diagram of a system 30 for drawing the triangle 10 in aliased form. A CPU 32 is connected to a floating point processor (FPU) 34 by bus 36. The CPU 32 is connected by a 32-bit system bus 38 to a random access memory (RAM) 40, a cache 42 and an interface 44 in graphics subsystem 45. The interface 44 is connected by bus 46 to graphics processor 48. The graphics processor 48 is connected by 120-bit graphics bus 50 to frame buffer 52. The frame buffer 52 is connected to a video digital to analog converter (DAC) 54 by bus 56. The DAC 54 is connected to video display 58 by line 60.

Figure 3:
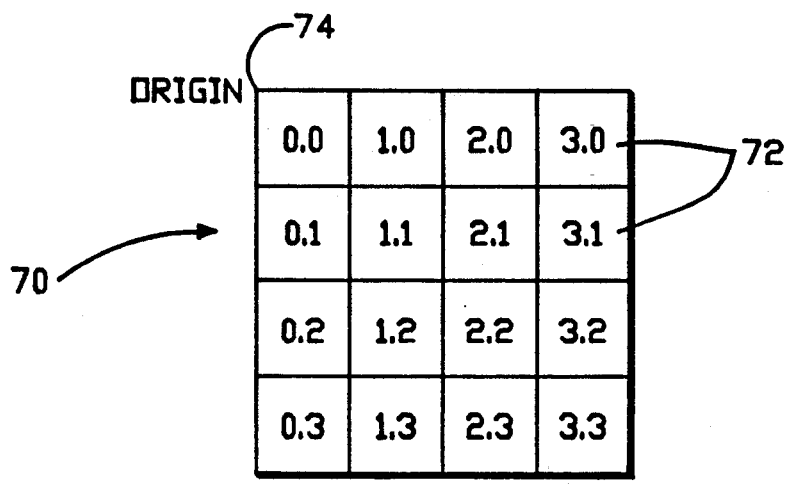
FIG. 3 is a two-dimensional array of pixels as used in the system of FIG. 2.

Locality of reference arguments dictate that the graphics processor 48 should update the frame buffer 52 in a rectangular array 70 of pixels 72, as shown in FIG. 3. The algorithm descriptions below use a 4×4 array as the exemplar, although actual implementations may differ. Multiple graphics processors 48 can be used together to achieve higher bandwidth to frame buffer memory 52. Each of the graphics processors 48 can access any 4×4 region in the frame buffer 52. When positioned at an arbitrary location, the upper left corner 74 represents the origin, and each pixel 72 within the array is represented by an (x,y) offset. The pixel 72 locations within the array are called sites. Each site contains information relevant to the corresponding pixel 72.

Figure 4:
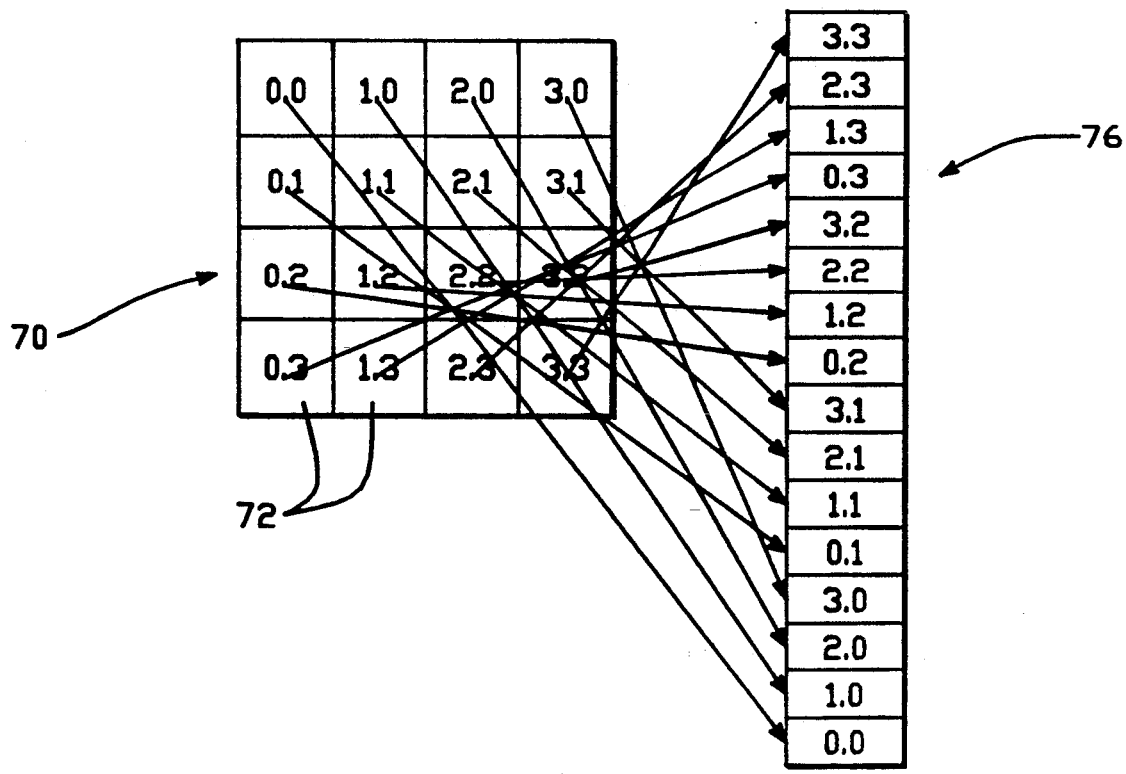
FIG. 4 is a diagram representing how the two-dimensional array of FIG. 3 is converted to a linear array.

The two dimensional representation of the array 70, shown in FIG. 3, is useful as a guide to understanding the geometry of the algorithms because there is an intuitive one-to-one mapping between sites 72 in the array 70 and pixels in the frame buffer 52. Alternatively, the array 70 could be represented linearly as shown at 76 in FIG. 4. A linear representation turns out to be more useful for describing the hardware implementations of the algorithms as the graphics processor 48 chip actually lays out its registers linearly.

Figure 5A:
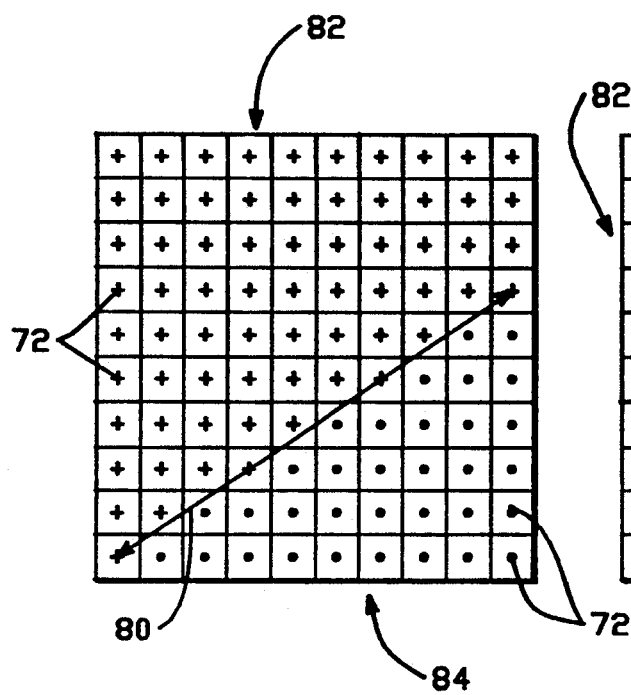
FIGS. 5A-5D show how a polygon is represented in the system of FIG. 2.
Figure 5B:
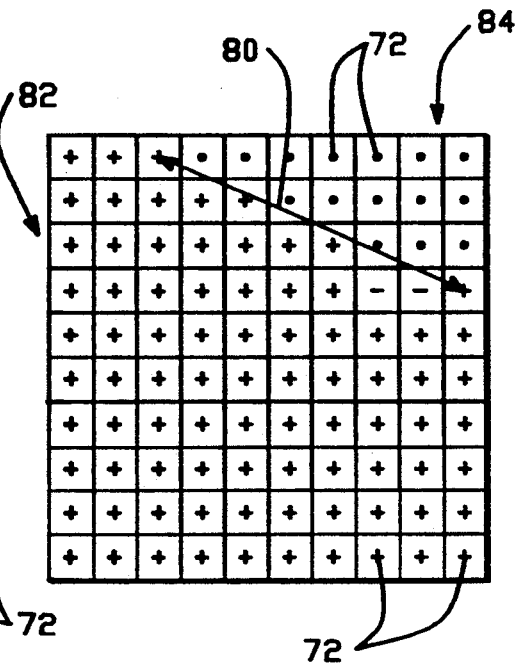
Figure 5C:
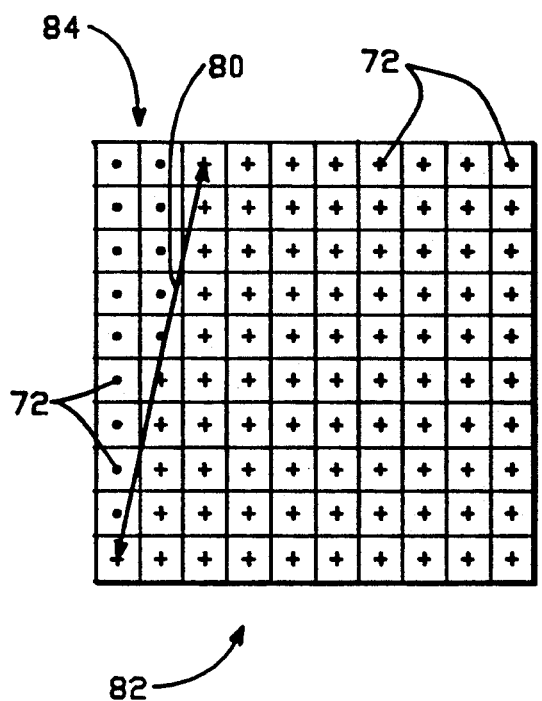

The fundamental geometric primitive in the graphics processor 48 is the evaluation of a geometric half-space. As shown in FIGS. 5A, 5B and 5C, any line 80 in a plane divides the plane into two half-spaces 82 and 84. The half-space evaluation determines on which side of a line 80 any point lies. All points to the right of a line are in one half-space, while all points to the left are in the other.

The graphics processor 48 support three geometric primitives: triangles, convex quadrilaterals, and lines. These primitives were chosen because of their geometric simplicity, and because more complex primitives can be constructed with them. More complicated primitives such as convex polygons provide more generality, but at the expense of a huge increase in the complexity of the graphics subsystem. Since arbitrary convex polygons are unbounded in the amount of data needed to describe them, the size of an atomic operation to a graphics chip is also unbounded. Some graphics subsystems interrupt the CPU to add new edges while scan converting polygons. This scheme is not only complex, but also unacceptable in a multiprocessor environment. To allow efficient use of the processors, the size of an atomic operation must be small. Complicated polygons can easily and efficiently be tessellated into triangles or quadrilaterals by the CPU 32. In fact, for smooth shading, since three points define a plane and more than three points is an over constraint, breaking a polygon into triangles will generally give better results.

Figure 5D:
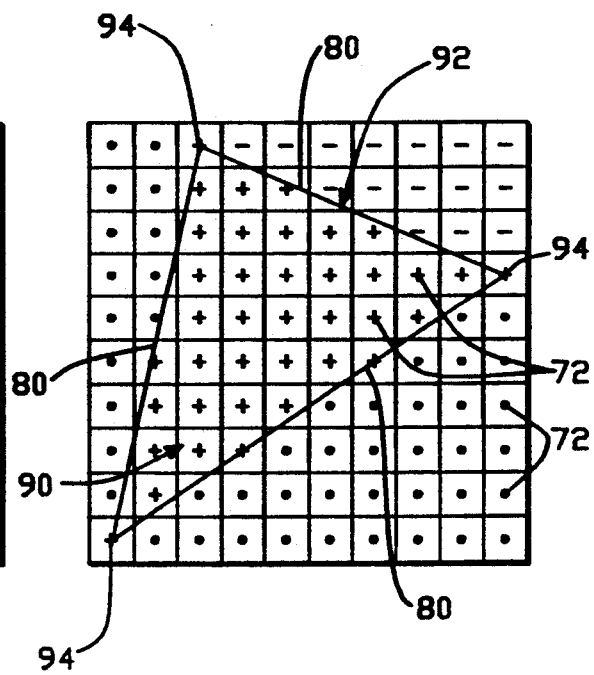

The basic math for half-space geometry is simple, and its VLSI implementation can be made very regular and efficient, but by itself the half-space provides no useful primitive for 2D or 3D graphics. However, consider the interior 90 of a triangle 92, as shown in FIG. 5D. It is nothing more than the intersection of three half spaces 82. The triangle 92 is modeled as three edges 80 sharing vertices 94. The graphics processor 48 can determine on which side of an edge 80 any pixel 72 lies. It can mark a pixel 72 as '+' or '−' with respect to an edge 80. A '+' means that a pixel 72 is inside a triangle 92 with respect to an edge 80, while a '−' means that it is outside. To determine the insidedness of a pixel 72 with respect to the entire triangle 92 is a simple test of insidedness with respect to the three edges 80, implemented as the logical and of the sign bits of the component half-space evaluations. Clearly, the half-space geometry applies equally well to convex quadrilaterals, which are simply the intersection of four half-spaces.

Figure 6:
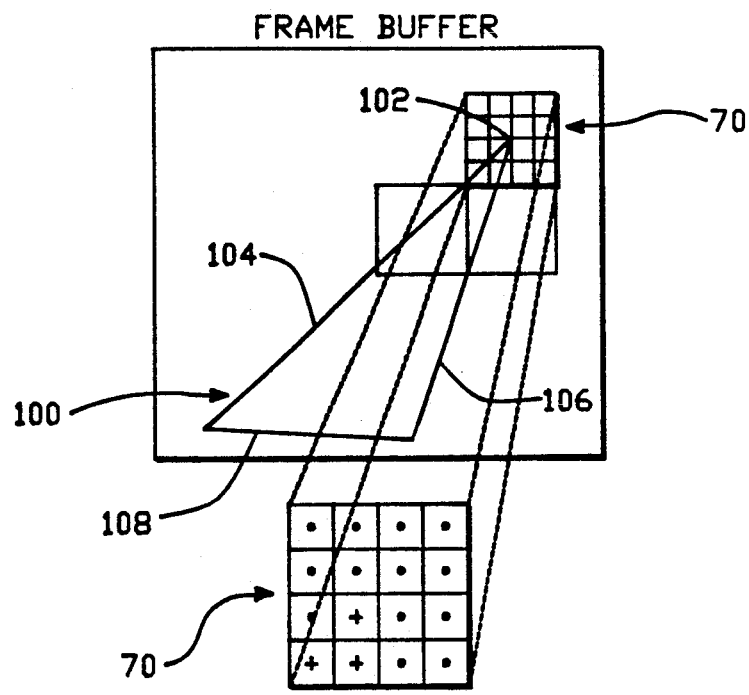
FIG. 6 is a diagram showing a portion of the method of this invention.

The basic building blocks have been established; the array 70 as a unit of frame buffer memory 52 reference, the half-space evaluations to determine which pixels 72 are included in a geometric Figure, and the plane evaluations to determine the object properties at interior pixels 72. The basic models of the supported geometry have been established in terms of half-space geometry, but there has not yet been a discussion of the realization of these geometric models in terms of the array memory 52 reference. The generation of multiple array references to tile a geometric Figure is called path tracing, and is made easy by the half-space representations employed. The graphics processor 48 algorithms test the half-space geometry at each array reference to determine in which direction the geometric Figure extends, thereby indicating where the next array reference should be. This array movement continues until the entire geometric Figure has been tiled. FIG. 6 shows how the basic array 70 is used to tile a triangle 100. The array 70 is positioned at top 102 of the triangle 100, then moved down and to the left along line 104, and scanned to the right as many repetitions until it intersects the line 106. These operations are repeated until line 108 is reached and scanned by the array 70.

The construction of geometric shapes given a half-space evaluator as the basic primitive is both geometrically and conceptually appealing. The half-space representation is a mathematical model which is sampled at pixel coordinates, discretizing the representation to that of the frame buffer 52. Conceptually, this mathematical representation sampled at the pixel frequency provides a straight forward, elegant approach to the rendering of common computer databases. The following description shows that this conceptual elegance lends itself to a simple implementation, providing high parallelism at relatively low cost.

The basic math used to evaluate a half-space is based on the general line equation:

$$y = mx + b$$

where m is the slope of the line and b is the y-intercept. The above equation is true for values of x and y on the line $y > mx + b$ on one side of the line, and $y < mx + b$ on the other.

For a specific line passing through (x1,y1) and (x2,y2), the constants for the line equation are:

$$m = dy/dx$$

$$b = y1 - dy/dx \, x1$$

where $dy = y2 - y1$, and $dx = x2 - x1$.

These values are found by solving the set of simultaneous equations for the unknowns m and b:

$$y1 = mx1 + b$$

and $$y2 = mx2 + b.$$

Thus, to evaluate a half-space parametrized by two points, (x1,y1) and (x2,y2), requires the evaluation of the linear equation:

$$y = dy/dx\, x + y1 - dy/dx\, x1 \quad (1)$$

Figures 7A, 7B:
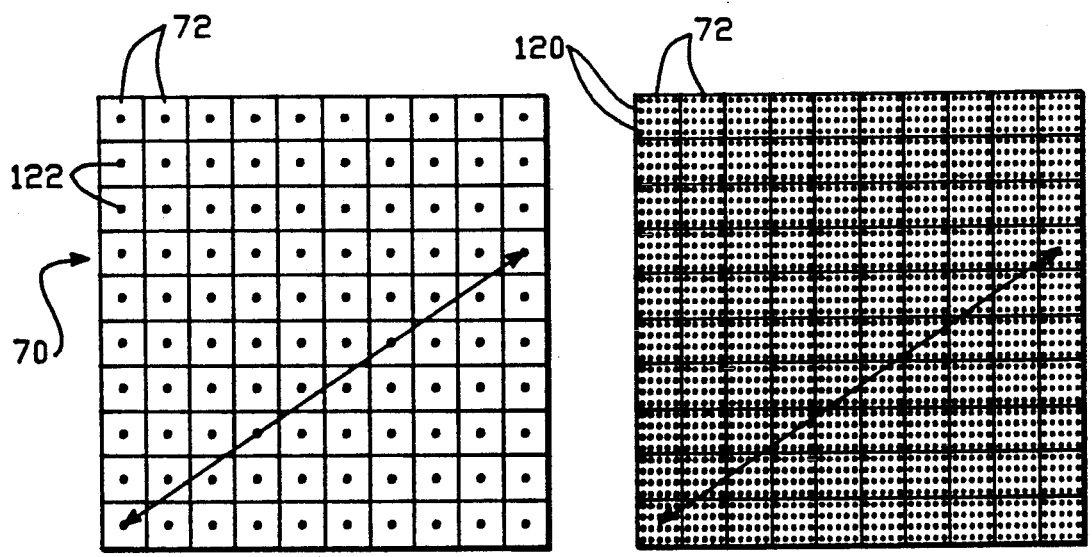
FIGS. 7A and 7B are two-dimensional pixel arrays showing another portion of the method of the invention.

The mathematics of the previous discussion was presented in a real number system. However, the addressing of raster frame buffers requires the discretization of the real number values of x and y. This discretization is known as sampling, as represented in FIG. 7A. The goal of simple raster graphics is to sample the half-space equation at discrete pixel 72 addresses, representing one sample point per pixel 72. In this matter, each pixel 72 in the graphics processor 48 array 70 can decide whether it is inside or outside a geometric Figure.

Alternatively, certain antialiasing algorithms determine the percentage of a pixel 72 inside a geometric Figure by supersampling, as represented in FIG. 7B. Taking multiple samples 120 from a single pixel 72 and averaging can provide very good antialiasing if the number of samples is large enough. Since the sampling frequency is independent of the mathematics, different algorithms can sample the same line equation at different frequencies.

Figure 8:
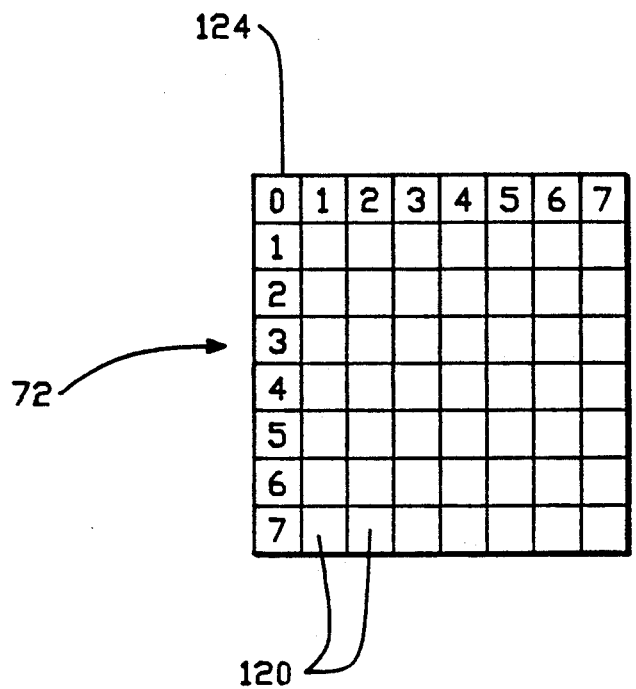
FIGS. 8-9 are further two-dimensional pixel arrays showing additional portions of the method of the invention.

Forcing endpoints to pixel centers 122 produces poor results for antialiased pictures. Aliased pictures will also benefit from subpixel positioning, although the improvement is less dramatic due to the lower quality of the image. It is very important to allow endpoints to be positioned at a higher resolution than current frame buffer's memory cost and video bandwidth allow. Hence, the graphics processor 48 use a fixed point notation for vertices of polygons and endpoints of lines. As shown in FIG. 8, each pixel 72 is broken up into an 8 by 8 grid, with (0,0) in the upper left corner 124. Coordinates given to the graphics processor 48 can be viewed as a subpixel 120 position appended to a pixel 72 coordinate. The coordinate (x,y) is located at pixel (x div 8, y div 8) with a subpixel coordinate value of (x mod 8, y mod 8). Data can be given to the graphics processor 48 in either sub-pixel 120 format, or basic pixel 72 coordinate format. If pixel 72 coordinate format is used, then internally, the graphics processor 48 will immediately shift the data left by 3 bits upon entering the chip.

The math for this is very simple. Let's go back to equation (1):

$$y = dy/dx\, x + y1 - dy/dx\, x1$$

Notice that this equation has no strict binding to the pixel coordinate system. Externally, the coordinate system in which the equation is evaluated is irrelevant: the math still works. Thus dx, dy, x1, and y1 are scaled up by a factor of 8 to provide sub-pixel 120 coordinate values. Previously, we were sampling in a coordinate system where each pixel 72 corresponded to one unit, and therefore were interested in values of x and y of {0, 1, 2, 3, ...}. Now, in order to sample at each pixel 72, we will have to sample at values of {0, 8, 16, 24, ...}. Since our new coordinate system is 8 times larger, pixels 72 are 8 units apart, and this spacing will give one sample per pixel. Notice that sampling occurs in the upper left corner 124 of a pixel, where the sub-pixel portion of the address is (0,0).

Figure 9:
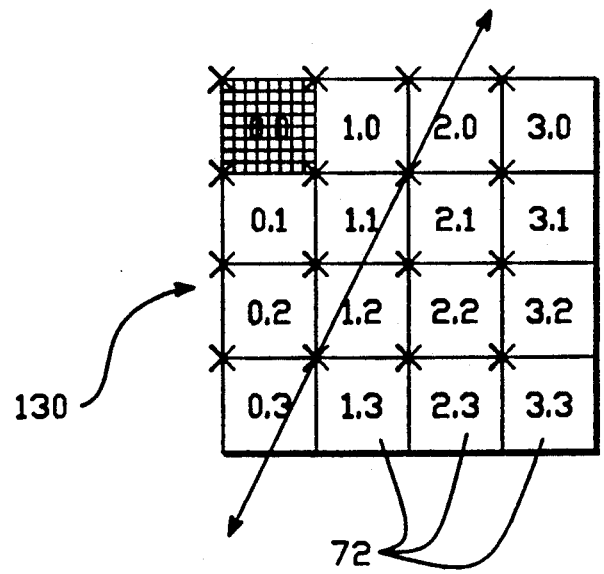

Given the technology for evaluating a half-space, the next step is to apply this math to the frame buffer via the graphics processor 48. As shown in FIG. 9, remember that the graphics processor 48 is capable of updating a 4×4 region 130 in parallel. Thus, for any given 4×4 region 130 on the screen, the parallel evaluation of the line equation, $$y = dy/dx\, x + y1 - dy/dx\, x1$$

at each of the 16 coordinate values will determine the insidedness at each of the 16 sites 72 in a single evaluation time. To evaluate a half-space over a region larger than 4×4 requires that the array 130 be dragged over the region, tiling it completely. If the evaluation can be made less than or equal to VRAM access time, then the update is bound by memory access, not the speed of the algorithm.

Since a raster device inherently samples at discrete values, evaluation of a half-space is achieved by evaluating the line equation at each pixel 72 in the frame buffer 52. In practice, only those pixels in close proximity to the desired result are evaluated. Although conceptually simple, it is not readily apparent that a VLSI implementation of half-space evaluation can be made cheaply and efficiently. The description below describes a very simple and efficient technique for the parallel evaluation of a line equation at discrete values.

A logical starting place is with the line equation:

$$y = mx + b$$

For a line through (x2,y2) and x2,y2), the constants are:

$$m = dy/dx$$

$$b = y1 - dy/dx\, x1$$

where dy=y2−y1, and dx=x2−x1.
Therefore, $$y = dy/dx\, x + y1 - dy/dx\, x1$$

$$y - dy/dx\, x - (y1 - dy/dx\, x1) = 0$$

Since divides are numerically expensive and cause a loss of precision, multiply both sides by dx:

$$dxy - dyx - dxy1 + dyx1 = 0$$

The left side of the equation is 0 for (x,y) on the line, positive on one side of the line, and negative on the other side. By merely evaluating the sign of the equation at each site in the 4 by 4 array, the graphics processor 48 can determine sidedness at each pixel 72. However, the simplicity sought by a VLSI implementation has not yet been achieved as the calculation of dxy and dyx is still too difficult, involving two multiplies and one add at each site. This is prohibitively expensive in both die size and execution time. With a few simple substitutions, the multiplies can be moved from the per pixel stage to the per half-space stage, leaving the pixel evaluation stage with a single add with sign compare.

Now, let (originx, originy) represent the origin of the region 130. Also, let (offsetx, offsety) be the offset from that origin such that x=originx+offsetx, and y=originy+offsety.

Substituting for x and y, $$dx(originy + offsety) - dy(originx + offsetx) - dxy1 + dyx1 = 0$$

$$dx \cdot originy + dx \cdot offsety - dy \cdot originx - dy \cdot offsetx - dxy1 + dyx1 = 0$$

Rearranging to get the final equation, $$dx \cdot offsety - dy \cdot offsetx = dx \cdot originy + dy \cdot originx + dxy1 - dyx1$$

$$dx \cdot offsety - dy \cdot offsetx = \quad (2)$$
$$- dx \cdot originy + dy \cdot originx + \quad (3)$$
$$dxy1 - dyx1 \quad (4)$$

Notice when the evaluation of the different expressions occurs, as well as the duration of their validity. Some expressions are calculated once for the entire half-space, and some are calculated once per instance of the array 130 (i.e. when the array 130 is moved, the expression must be reevaluated). No expression is evaluated once per site. Thus, a high degree of parallelism can be realized at very low cost. The values of dx, dy, x1, and y1 are clearly constant for the definition of a geometric half-space, indicating that (4) is evaluated once per half-space and is unaffected by position in the array 130 or movement of the array 130.

Offsetx and offsety are positive integers (0, 8, 16, 24) representing x and y offsets from the origin of the chip, whose values are fabricated into the chip. The values are (0, 8, 16, 24) instead of (0, 1, 2, 3) because the grid assumes sub-pixel positioning and sampling is once per pixel. Thus, (2) is also calculated once for the entire line. Furthermore, its evaluation can be simplified to successive adds of dx and dy since its values are regularly spaced. Expression (2) contains the only values that are dependent upon position in the array.

The only expression that is affected by the position of the array 130 is (3), dx·originy−dy·originx. This leaves only 2 multiplies and one add per instance of the array, as compared to 2 multiplies and one add per site 72 within the array 130.

This section describes a simple VLSI circuit to implement the algorithm from the previous section. The line equation, $$dx \cdot offsety - dy \cdot offsetx = dx \cdot originy + dy \cdot originx + dxy1 - dyx1$$

$$dx \cdot offsety - dy \cdot offsetx = \quad (2)$$
$$- dx \cdot originy + dy \cdot originx + \quad (3)$$
$$dxy1 - dyx1 \quad (4)$$

has only one subexpression which is different for each site 72 within the array 130: expression (2). As this term must be computed for all 16 permutations of the allowable values for offsetx and offsety, it is seemingly the most demanding calculation. Fortunately, the regularity of the discrete grid 130 provides a very efficient implementation. Tables I and II illustrate the regularity of the values needed for the subexpressions of (2), dx·offsety and dy·offsetx.

TABLE I

| dx offsety y site | offsety | dx offsety |
|---|---|---|
| 0 | 0 | 0 |
| 1 | 8 | 8 dx |
| 2 | 16 | 8 dx + 8 dx |
| 3 | 24 | 8 dx + 8 dx + 8 dx |

TABLE II

| dy offsetx x site | offsetx | dx offsety |
|---|---|---|
| 0 | 0 | 0 |
| 1 | 8 | 8 dy |
| 2 | 16 | 8 dy + 8 dy |
| 3 | 24 | 8 dy + 8 dy + 8 dy |

Figure 10:
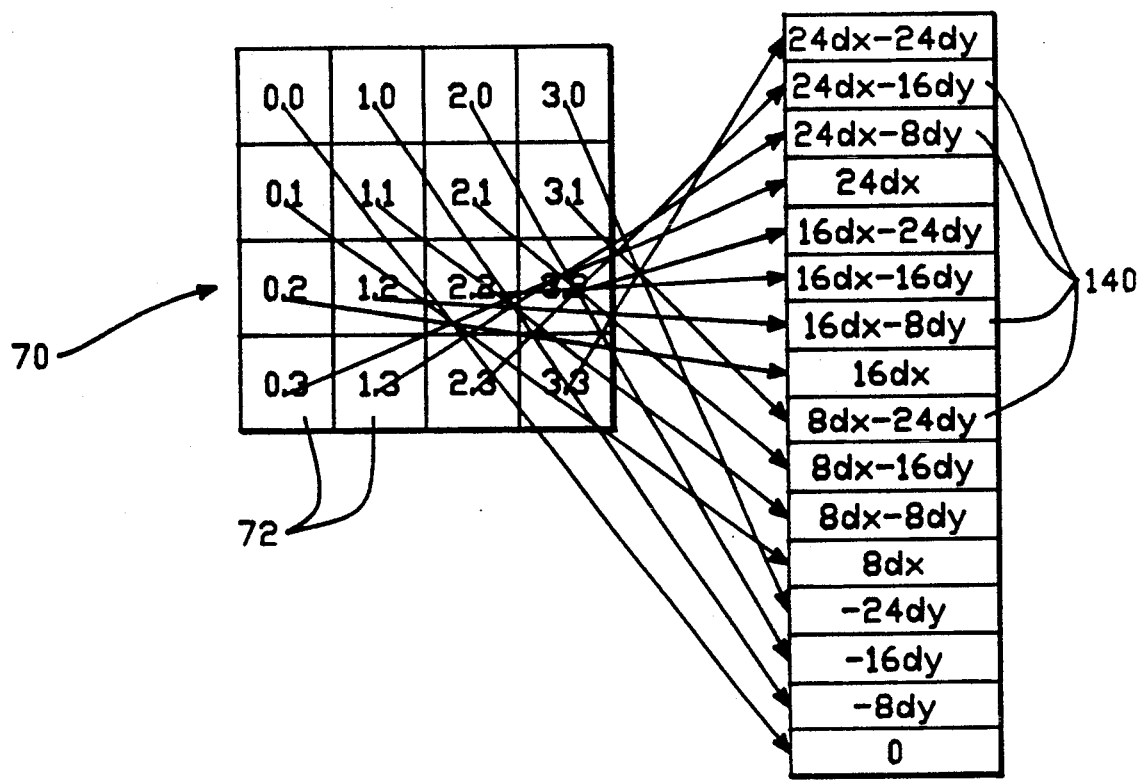
FIG. 10 is a diagram like that of FIG. 4, but with certain mathematical representations useful for understanding the method of the invention.

The generation of these tables is simple. Each value in the array 70 (FIG. 10) is simply 8 times dx or dy, implemented as a right shift by 3, added to the previous value in the array. Once these values have been obtained, (2) is calculated by a single subtraction, dx·offsety−dy·offsetx, at each of the 16 sites 72. The sites are filled out serially with a very efficient systolic array implementation. The results of this subtraction must be stored at each of the 16 sites 140 as shown in FIG. 10.

Figure 11:
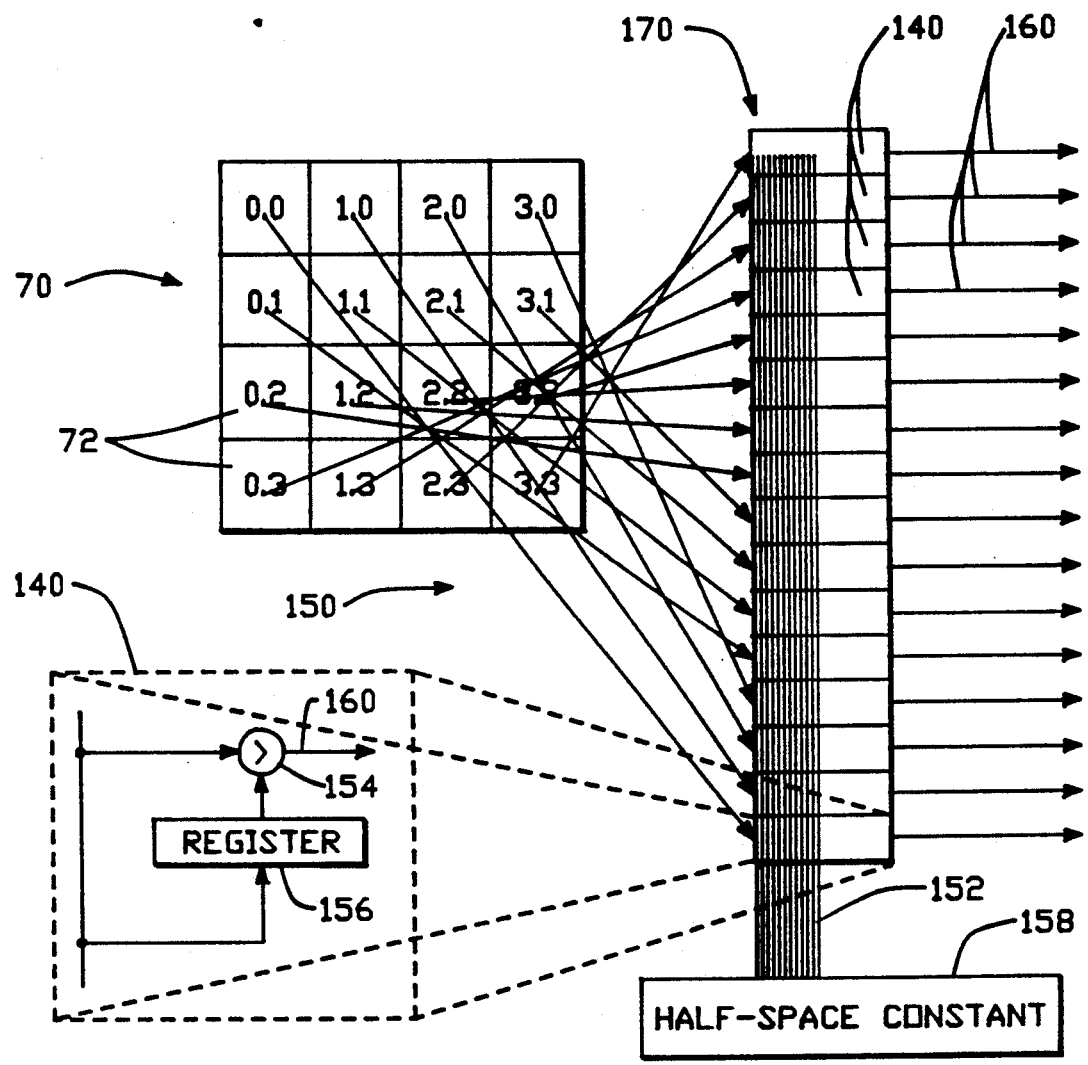
FIG. 11 is a more detailed block diagram of a portion of the system of FIG. 2.

The other terms in the line equation are independent of the offset within the array. The sum (3)+(4) is called the half-space constant. Given that (2) from the half-space equation is stored at each of the sites 140 as shown, the sign of the sum of the site value and the half-space constant will give the sidedness of the pixel 72 with respect to the line 80 (FIGS. 5A–5D). Since the half-space constant is independent of the site offset coordinates, the same value is added to each of the sites. Thus, the VLSI structure 150 (FIG. 11) is very simple. A single n bit bus 152 runs across the values at each site 140, which is added to the values stored at the sites 140. Since the sign bit is the only interesting bit, it suffices to use a magnitude comparator 154 instead of an adder. Thus, each site 140 is equipped with a magnitude comparator 154 and a register 156 to hold the site 140 values. The comparator 154 determines in which half-space each of the pixels 72 lie. FIG. 11 shows a block diagram of the VLSI cell for each site 140 within the array. The register is loaded from bus 152 when the half-space is initialized. Each time the array 70 moves, the register 156 contents are compared to the half-space constant 158 on the bus 152. The outputs of the circuits at 160 are the results of the compares.

FIG. 11 shows the collection 170 of site cells 160 which form the VLSI structure to perform the parallel evaluation of a half-space at each of the 16 sites 140 within the array 70. This structure is called a half-space evaluator or half-space tower. The column of wires of bus 152 represent the single value, (3)+(4), that is added to each of the values stored at the sites 140. Each site 140 contains a comparator and a register as shown in FIG. 11. The lines 160 coming from each site 140 are boolean values indicating in which half-space the site's pixel 72 lies.

Figure 12:
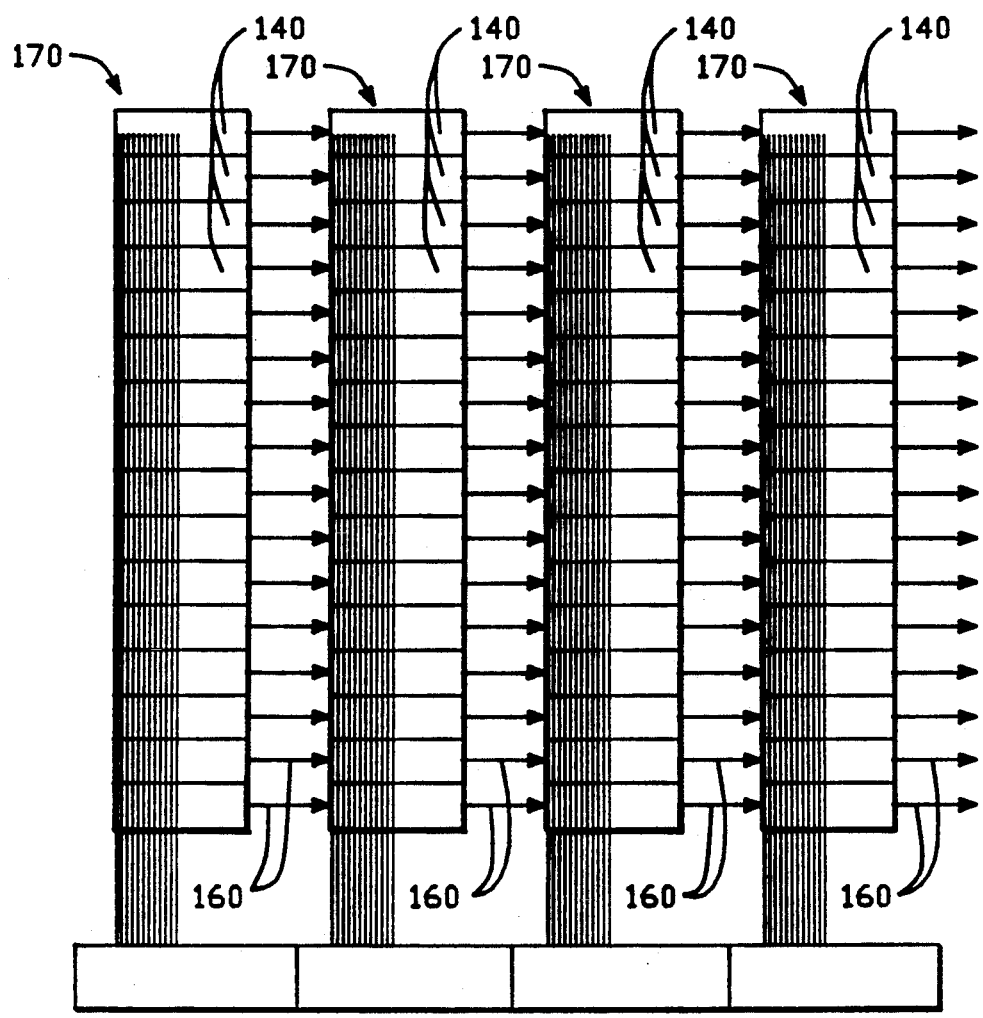
FIG. 12 is another more detailed block diagram of a further portion of the system of FIG. 2.

Given the circuit 140 for a half-space evaluator, a quadrilateral evaluator as shown in FIG. 12 is trivial. The same circuit is used four times, once for each edge of the quadrilateral. The boolean results at corresponding sites 140 in four half-space evaluators are logically anded to determine the insidedness of each of the pixels 72. If a pixel 72 is in the quadrilateral with respect to all four edges, then it is inside the quadrilateral; otherwise, it is outside. Similarly, the line evaluator uses the four half-space evaluators to achieve the line model presented earlier. The triangle model requires only three of the evaluators, and therefore disables the fourth. FIG. 12 shows the interaction of the individual half-space towers 170. The boolean wires 160 running across the towers 170 are wire anded to produce the final result.

To achieve the one to one correspondence between the boolean wires 160 at each site and pixels in the frame buffer 52, the wires 160 go directly to pads on the graphics processor 48 which in turn become the write enables for the individual memory chips. Since the 16 pixels are in 16 different memory chips, the wires provide individual control of the pixels. A '1' enables the memory chip for writing, while a '0' disables it.

As the field of computer graphics grows, the quest for visual realism strengthens. Techniques such as ray tracing, texture mapping, antialiasing, transparency, and many others have been used effectively to produce realistic images. These techniques have been predominantly software oriented, or have made use of very expensive special purpose hardware. The geometric simplicity and rich frame buffer update technology in the graphics processor 48 provide a good opportunity to move some of the advanced rendering techniques into hardware.

The sampling involved in transforming a geometric shape from a continuous geometric representation to a discrete pixel representation causes defects such as jagged edges and lost detail. The problem is referred to as aliasing, and is caused by an undersampling of the geometric Figure. In standard raster graphics, lines and polygons are sampled only at discrete grid locations or pixels. Aliasing is particularly apparent on low resolution devices where the sampling frequency is lower. As the resolution increases, the ability of the human eye to detect the aliasing decreases. Regardless of the display resolution, sampling at discrete grid locations will never remove aliasing. It will, however, decrease our ability to detect it. This section describes the antialiasing technique used by the graphics processor 48. Descriptions given deal with triangles only, but the technique works with all supported geometric primitives.

Figure 13:
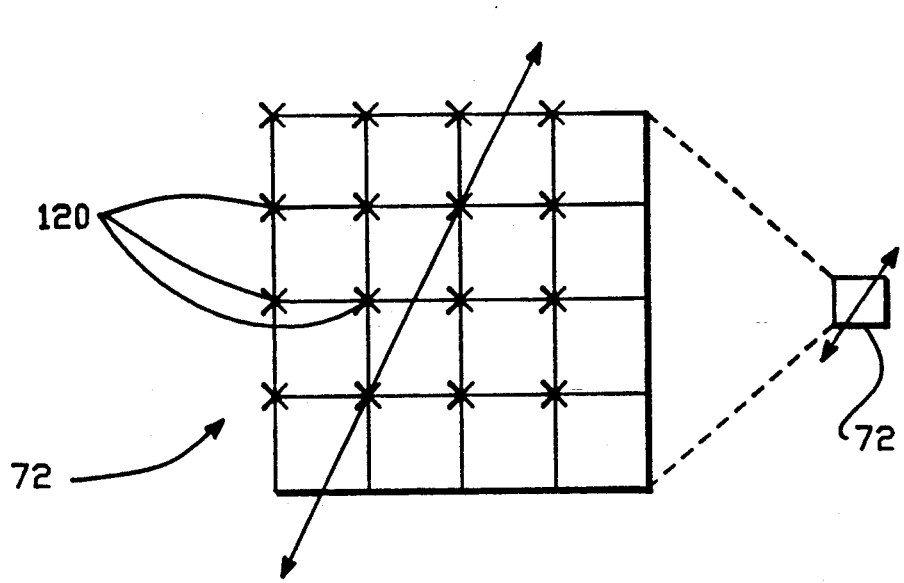
FIG. 13 is a two dimensional pixel subarray, useful for understanding the method of the invention.

The graphics processor 48 uses a technique known as supersampling to combat the effects of aliasing. Supersampling implies sampling at a higher resolution than the display hardware supports, and averaging down to pixel resolution. Since frame buffer 52 memory is a valuable commodity, it would be a mistake to supersample an entire scene and then average down. To sample at 16 times the display resolution would require 16 times the frame buffer memory 52. A more cost effective approach is to take 16 samples within a pixel 72 (FIG. 13) while rasterizing a polygon, and average the 16 samples before writing to the frame buffer. In normal (aliased) mode, the graphics processor 48 use the 16 sites in the chip to sample 16 pixels 72. When drawing a triangle or line in antialiased mode, the graphics processor 48 use the 16 sites to sample at 16 locations 120 within a single pixel 72. Note that the performance is lower for antialiasing because full memory bandwidth is not achieved.

This fits in very easily with the algorithms already presented. The algorithm for antialiasing uses the same edge equation that we presented previously:

$$dxoffsety - dyoffsetx = -dxoriginy + dyoriginx + dxyl - dyxl$$

$$dxoffsety - dyoffsetx = \\ -dxoriginy + dyoriginx + \\ dxyl - dyxl$$

Since coordinates are scaled up by 8 from pixel resolution, evaluating this equation at values for offsetx and offsety of $\{0, 2, 4, 6\}$ will provide 16 equally spaced samples within a single pixel 72. The color at the pixel 72 is the sum of the colors at those sample points that are inside the polygon, divided by the total number of samples taken (16). Since the total number of samples is a power of 2, the divide reduces to an arithmetic shift. Thus, the formula for the calculation of an antialiased pixel value is:

$$\frac{\sum_{i=0}^{16} site_i}{16}$$

Figure 14:
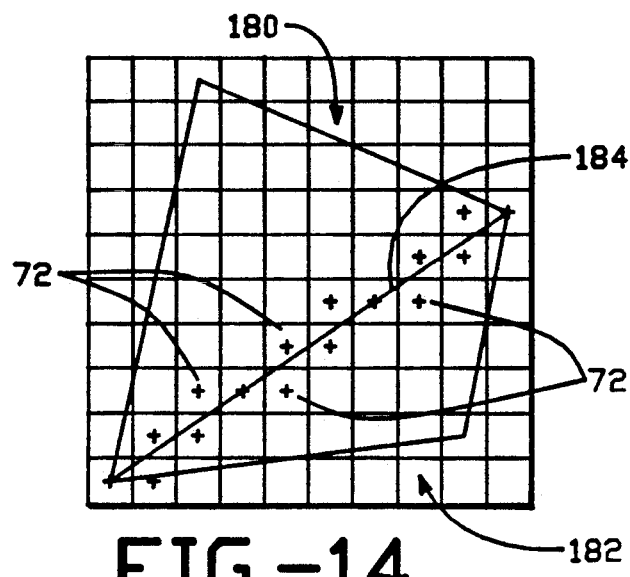
FIG. 14 is a two-dimensional pixel array showing operation of a portion of the method of the invention.

The antialiasing described works fine for a single triangle, but consider the case of two triangles sharing an edge. The first triangle is antialiased and placed into the frame buffer 52, and the second triangle is then antialiased and placed in the frame buffer 52. The pixels along the edge which were in both triangles will have the values of the second triangle only. However, the color values from the first triangle should persist and be blended with the color values from the second triangle. But there is not yet enough information when rendering the second triangle to properly handle the color blending. FIG. 14 shows two adjacent triangles 180 and 182 with the pixels 72 along the shared edge 184 marked '+'.

It is necessary to keep an extra piece of pixel information indicating the percentage of a pixel that is covered. This has commonly been called an $\alpha$- or coverage channel. The graphics processor 48 will maintain an 8 bit $\alpha$ channel. A 0 in the $\alpha$ channel at a pixel indicates that the pixel is empty. A 255 in the $\alpha$ channel indicates that the pixel is completely covered. Pixels on the boundaries of polygons will generally have a values somewhere between 0 and 255, indicating that they are partially covered. The $\alpha$ value for a pixel in a triangle is determined by the number of subpixel samples inside the triangle, divided by the total number of subpixel samples taken. This is a number between 0 and 1 which is then scaled to the range 0 to 255. The actual calculation of $\alpha$ is just a count of the number of samples inside the triangle, multiplied by 16, and the value clamped at 255. The value must be clamped because if all 16 samples are in the triangle, then just multiplying by 16 will give 256 due to the dual representation of 1 in the fixed point number system.

Antialiased triangles must be sorted from front to back and rendered in that order. The basic paradigm is that the renderer adds to a pixel until it is full, implying that all other triangles are hidden at that pixel and not added to the frame buffer 52. Thus, along with the x sort, the $\alpha$-channel resolves hidden surfaces. When adding to the frame buffer 52, the following formulas are used:

$$i_{new} = i_{fb} + MIN(1 - \alpha_{fb}, \alpha_{tri}) i_{tri}$$
$$\alpha_{new} = \alpha_{fb} + MIN(1 - \alpha_{fb}, \alpha_{tri})$$

where $\alpha_{fb}$ = current $\alpha$ value in the frame buffer
$i_{fb}$ = current intensity value in the frame buffer
$\alpha_{tri}$ = $\alpha$ value from new triangle (based on number of subpixel samples inside triangle)
$i_{tri}$ = intensity value from new triangle
$\alpha_{new}$ = $\alpha$ value to be put into the frame buffer
$i_{new}$ = intensity value to be put into the frame buffer.
The formulas above use normalized $\alpha$ values between 0 and 1.

Note that this approach is not as robust as the A-buffer antialiased hidden surface algorithm used at Lucas-Film, but will perform well in a large class of applications and is much simpler to implement in hardware. The graphics processor 48 algorithm is simpler and the memory requirements are much less—the memory required by the LucasFilm A-buffer is bounded by the complexity of the scene as well as the size of the frame-buffer. The memory requirements of the graphics processor 48 are bounded only by the size of the frame buffer 52. Its limitations with respect to the A-buffer are its inability to recognize which portions of a pixel have been previously covered, and its inability to resolve hidden surface issues between polygons which overlap in z. These are thought to be reasonably small limitations for a large number of applications which could benefit from antialiased polygons.

It should further be apparent to those skilled in the art that various changes in form and details of the invention as shown and described may be made. It is intended that such changes be included within the spirit and scope of the claims appended hereto.

What is claimed is:

1. A system for drawing antialiased polygons, which comprises a host data processor, a memory connected to said host data processor by a bus, a graphics processor connected to said bus, a display including a plurality of pixels for displaying the polygons, and a frame buffer connected between said graphics processor and said display, said graphics processor including a program for calculating values of an image array, said image array being selectively reconfigurable by said program to comprise either a plurality of the pixels or a plurality of subpixels within one of the pixels, lines of the polygons being determinable with said program by dividing a plane of the display surface into geometric half spaces with the lines and categorizing the half spaces by which side of the lines on which the half spaces are located, said graphics processor comprising a plurality of array registers and a plurality of comparators, each of said plurality of array registers being connected to one of said plurality of comparators, said registers and comparators for storing and comparing said values calculated by said program to determine in which said half space said pixels or subpixels in said image array reside.

2. The system for drawing antialiased polygons of claim 1 in which said image array is scannable by said program to draw the polygons by moving from a first location at a first line of the polygons in a first direction until encountering a second line of the polygon, in a second direction along the the first line, then in the first direction until encountering the second line, repeating until encountering a third line of the polygons.

3. The system for drawing antialiased polygons of claim 1 in which the pixels of the display are determinable with said program as inside the polygons by logically combining the categorization of the side of the lines on which the half spaces are located.

4. The system for drawing antialiased polygons of claim 3 in which the lines of the polygons are determinable with said program by evaluating a linear equation equivalent to:

$$y = dy/dx\, x + y1 - dy/dx\, x1,$$

where x and y are coordinates on an x-axis and a y-axis, respectively, x1 and y1 are incremental values from the coordinates x and y, respectively and dx/dy is the derivative of x with respect to y, respectively representing a rate of change in values of x as values of y change, said derivative dx/dy representing a constant for said linear equation.

5. The system for drawing antialiased polygons of claim 4 in which the linear equation is evaluatable with said program by determining the relationship:

$$dx\,(\mathit{offsety}) - dy\,(\mathit{offsetx}),$$

where, y offsetx, offsety are a pixel or subpixel's offset from an origin of said image array and dx (offsety) and dy (offsetx) are the derivatives of x (offsety) and y (offsetx).

6. The system for drawing antialiased polygons of claim 1 in which the polygons are antialiasable with said program by determining what proportion of the subpixels within each pixel are within the polygons and setting a color of each pixel on the basis of the proportion.

7. A system for drawing antialiased polygons, which comprises a host data processor, a memory connected to said host data processor by a bus, a graphics processor connected to said bus, a display including a plurality of pixels for displaying the polygons, and a frame buffer connected between said graphics processor and said display, said graphics processor including a program for calculating values of an image array, said image array being selectively reconfigurable by said program to comprise either a plurality of the pixels or a plurality of subpixels within one of the pixels, lines of the polygons being determinable with said program by dividing a plane of the display surface into geometric half spaces with the lines and categorizing the half spaces by which side of the lines on which the half spaces are located by logically combining the categorization of the side of the lines on which the half spaces are located, the lines of the polygons being determinable with said program by evaluating a linear equation equivalent to:

$$y = dy/dx\, x + y1 - dy/dx\, x1,$$

where x and y are coordinates on an x-axis and a y-axis, respectively, x1 and y1 are incremental values from the coordinates x and y, respectively and dx/dy is the derivative of x with respect to y, respectively representing a rate of change in values of x as values of y change, said derivative dx/dy representing a constant for said linear equation, said linear equation being evaluatable with said program by determining the relationship:

$$dx\,(\mathit{offsety}) - dy\,(\mathit{offsetx}),$$

where offsetx, offsety are a pixel or subpixel's offset from an origin of said image array and dx (offsety) and dy (offsetx) are the derivatives of x (offsety) and y (offsetx), said graphics processor comprising a plurality of array registers and a plurality of comparators, each of said plurality of array registers being connected to one of said plurality of comparators, said registers and comparators for storing and comparing said values calculated by said program to determine in which said half space said pixels or subpixels in said image array reside.

8. The system for drawing antialiased polygons of claim 7 in which said plurality of array registers are arranged in sets, with one set for each line of the polygons, each register of each set producing an output from one of said comparators, the outputs being combined to determine whether the pixels are inside the polygons.

9. The system for drawing antialiased polygons of claim 6 in which the polygons having a common edge are antialiasable with said program along the common edge by treating the pixels along the common edge in each polygon having the common edge as partially covered by the other polygon and blending the colors of the pixels along the common edge on the basis of extent of the partial coverage.

10. The system for drawing antialiased polygons of claim 9 in which the polygons are triangles and the colors of the pixels along the common edge are blended by using a relationship equivalent to:

$$i_{new} = i_{fb} + MIN(1 - a_{fb}, a_{tri}) i_{tri}$$

$$a_{new} = a_{fb} + MIN(1 - a_{fb}, a_{tri})$$

where
- $a_{fb}$ = current $a$ value in the frame buffer
- $i_{fb}$ = current intensity value in the frame buffer
- $a_{tri}$ = $a$ value from new triangle (based on number of subpixels inside triangle)
- $i_{tri}$ = intensity value from new triangle
- $a_{new}$ = $a$ value to be put into the frame buffer
- $i_{new}$ = intensity value to be put into the frame buffer.

11. In a system for drawing antialiased polygons having a graphics processor including a program for calculating values of an image array, the improvement comprising said image array being selectively reconfigurable for sampling by said program to comprise either a plurality of the pixels or a plurality of subpixels within one of the pixels, lines of the polygons being determinable with said program by dividing a plane of the display surface into geometric half spaces with the lines and categorizing the half spaces by which side of the lines on which the half spaces are located, said graphics processor comprising a plurality of array registers and a plurality of comparators, each of said plurality of array registers being connected to one of said plurality of comparators, said registers and comparators for storing and comparing said values calculated by said program to determine in which said half space said pixels or subpixels in said image array reside.

12. The system for drawing antialiased polygons of claim 11 in which the polygons are antialiasable with said program by determining what proportion of the subpixels within each pixel are within the polygons and setting a color of each pixel on the basis of the proportion.

13. The system for drawing antialiased polygons of claim 12 in which the polygons having a common edge are antialiasable with said program along the common edge by treating the pixels along the common edge in each polygon having the common edge as partially covered by the other polygon and blending the colors of the pixels along the common edge on the basis of extent of the partial coverage.

14. The system for drawing antialiased polygons of claim 13 in which the polygons are triangles and the colors of the pixels along the common edge are blended by using a relationship equivalent to:

$$i_{new} = i_{fb} + MIN(1 - a_{fb}, a_{tri}) i_{tri}$$

$$a_{new} = a_{fb} + MIN(1 - a_{fb}, a_{tri})$$

where
- $a_{fb}$ = current $a$ value in the frame buffer
- $i_{fb}$ = current intensity value in the frame buffer
- $a_{tri}$ = $a$ value from new triangle (based on number of subpixels inside triangle)
- $i_{tri}$ = intensity value from new triangle
- $a_{new}$ = $a$ value to be put into the frame buffer
- $i_{new}$ = intensity value to be put into the frame buffer.

15. In a system for drawing antialiased polygons having a graphics processor including a program for calculating values of an image array, the improvement comprising said image array being selectively reconfigurable by said program to comprise either a plurality of the pixels or a plurality of subpixels within one of the pixels, said graphics processor comprising a plurality of array registers and a plurality of comparators, each of said plurality of array registers being connected to one of said plurality of comparators, said registers and comparators for storing and comparing said values calculated by said program to determine whether said pixels or subpixels in said image array are inside the polygons.

16. The system for drawing antialiased polygons of claim 15 in which said plurality of array registers are arranged in sets, with one set for each line of the polygons, each register of each set producing an output from one of said comparators, the outputs being combined to determine whether the pixels are inside the polygons.

17. A method for drawing antialiased polygons, comprising the steps of providing a graphics processor including a program for calculating values of an image array, said graphics processor being provided as a plurality of array registers and a plurality of comparators, each of said plurality of array registers being connected to one of said plurality of comparators, said registers and comparators for storing and comparing said values calculated by said program, selectively configuring the image array with the program to comprise either a plurality of pixels or a plurality of subpixels within one of the pixels, calculating values of the image array as configured, antialiasing the polygons, and determining lines of the polygons with said program by dividing a plane of a display surface into geometric half spaces with the lines, categorizing the half spaces by which side of the lines on which the half spaces are located, and updating the pixels or subpixels in the image array with the program in parallel.

18. The method for drawing antialiased polygons of claim 17 further comprising scanning the image array with the program to draw the polygons by moving from a first location at a first line of the polygons in a first direction until encountering a second line of the polygons, in a second direction along the the first line, then in the first direction until encountering the second line, and repeating until encountering a third line of the polygons.

19. The method for drawing antialiased polygons of claim 17 further comprising the step of determining with the program whether the pixels of the display are inside the polygons by logically combining the categorization of the side of the lines on which the half spaces are located.

20. The method for drawing antialiased polygons of claim 19 in which the lines of the polygon are determined with the program by evaluating a linear equation equivalent to:

$$y = dy/dx \, x + y1 - dy/dx \, x1,$$

where x and y are coordinates on an x-axis and a y-axis, respectively, x1 and y1 are incremental values from the coordinates x and y, respectively and dx/dy is the derivative of x with respect to y, respectively representing a rate of change in values of x as values of y change, said derivative dx/dy representing a constant for said linear equation.

21. The method for drawing antialiased polygons of claim 20 in which the linear equation is evaluated with the program by determining the relationship:

$$dx \, (\text{offset}) - dy \, (\text{offsetx}),$$

where offsetx, offsety are a pixel or subpixel's offset from an origin of the image array and dx (offsety) and dy (offsetx) are the derivatives of x (offsety) and y (offsetx).

22. The method for drawing antialiased polygons of claim 17 in which the polygons are antialiased with the program by determining what proportion of the subpixels within each pixel are within the polygons and setting a color of each pixel on the basis of the proportion.

23. The method for drawing antialiased polygons of claim 22 in which the polygons having a common edge are antialiased with the program along the common edge by treating the pixels along the common edge in each polygon having the common edge as partially covered by the other polygon and blending the colors of the pixels along the common edge on the basis of extent of the partial coverage.

24. The method for drawing antialiased polygons of claim 23 in which the polygons are triangles and the colors of the pixels along the common edge are blended by using a relationship equivalent to:

$$i_{new} = i_{fb} + MIN(1 - \alpha_{fb}, \alpha_{tri}) \, i_{tri}$$

$$\alpha_{new} = \alpha_{fb} + MIN(1 - \alpha_{fb}, \alpha_{tri})$$

where
- $\alpha_{fb}$ = current $\alpha$ value in the frame buffer
- $i_{fb}$ = current intensity value in the frame buffer
- $\alpha_{tri}$ = $\alpha$ value from new triangle (based on number of subpixels inside triangle)
- $i_{tri}$ = intensity value from new triangle
- $\alpha_{new}$ = $\alpha$ value to be put into the frame buffer
- $i_{new}$ = intensity value to be put into the frame buffer.

* * * * *

UNITED STATES PATENT AND TRADEMARK OFFICE
CERTIFICATE OF CORRECTION

PATENT NO. : 5,287,438
DATED : February 15, 1994
INVENTOR(S) : Kelleher

It is certified that error appears in the above-identified patent and that said Letters Patent is hereby corrected as shown below:

Column 5,
Line 38, delete "use" and insert therefor -- uses --

Column 11,
Line 61, delete the first occurrence of "the" and insert therefor -- one of --
Line 61, delete "line" and insert therefor -- lines --
Line 62, delete "second line" and insert therefor -- other one of the lines --

Column 15,
Line 20, delete "dx (offset)" and insert therefor -- dx (offsety) --

Signed and Sealed this

Twenty-first Day of June, 2005

JON W. DUDAS
*Director of the United States Patent and Trademark Office*